United States Patent

Gruca et al.

[11] Patent Number: 5,700,199
[45] Date of Patent: Dec. 23, 1997

[54] METHOD FOR SIZING A LOCK NUT

[75] Inventors: Ned J. Gruca, St. Charles; Michael E. Ward, Geneva, both of Ill.

[73] Assignee: Illinois Tool Works Inc., Glenview, Ill.

[21] Appl. No.: 628,982

[22] Filed: Apr. 8, 1996

[51] Int. Cl.$^6$ .................................................. B21D 53/24
[52] U.S. Cl. ............................................................... 470/19
[58] Field of Search .................................. 470/18, 19, 20, 470/21, 88, 96, 198, 199

[56] References Cited

U.S. PATENT DOCUMENTS

| | | |
|---|---|---|
| 815,541 | 3/1906 | Leatherman . |
| 961,063 | 6/1910 | Austin . |
| 2,142,820 | 1/1939 | Olson . |
| 2,213,353 | 9/1940 | Whitcombe . |
| 2,221,961 | 11/1940 | Allen et al. . |
| 2,592,129 | 4/1952 | Engstrom ............................ 470/19 |
| 3,356,121 | 12/1967 | Tabor .................................. 470/19 |
| 4,352,219 | 10/1982 | McMurray et al. ................. 470/19 |
| 4,547,104 | 10/1985 | Holmes ............................... 470/19 |
| 4,603,446 | 8/1986 | Ozawa ................................ 470/19 |
| 5,499,893 | 3/1996 | Thurston et al. . |

*Primary Examiner*—Lowell A. Larson
*Assistant Examiner*—Ed Tolan
*Attorney, Agent, or Firm*—Thomas W. Buckman; John P. O'Brien; Donald J. Breh

[57] ABSTRACT

A method for making a lock nut engagable and retainable about a threaded shaft wherein a body member having a bore is threaded for receiving a threaded shaft, and at least a portion of the bore is deformed to provide threaded shaft engaging means engagable with a threaded shaft disposed in the bore. The deformed portion of the bore is then sized with a threaded sizing tool that is oversized relative to the deformed portion of the bore and undersized relative to any undeformed portion of the bore to provide a sized lock nut with a relatively consistent torque performance and a reduced statistical spread over several installation and removal cycles of the nut about the threaded shaft.

10 Claims, 3 Drawing Sheets

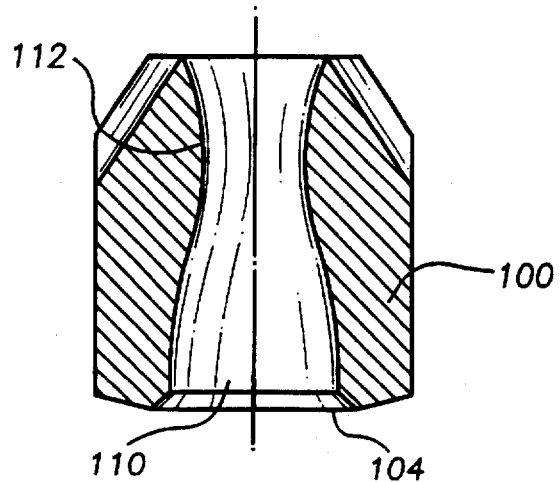
FIG. 1
PRIOR ART
FIG. 2
RELATED ART
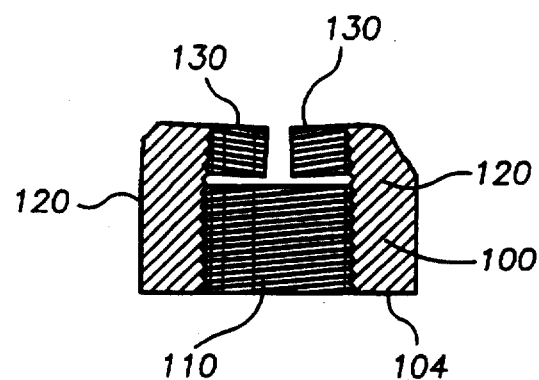
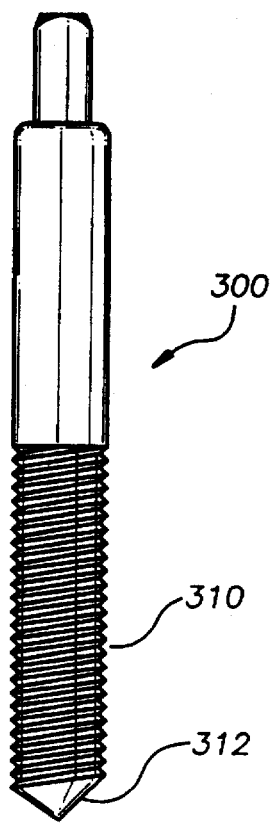
FIG. 3

METHOD FOR SIZING A LOCK NUT

BACKGROUND OF THE INVENTION

The invention relates generally to a method for making a lock nut, and more specifically to a method for making a lock nut having a relatively consistent torque performance with a reduced statistical spread over several nut installation and removal cycles.

Lock nuts engagable about a threaded shaft have many configurations and applications. Most lock nuts however require a relatively high installation torque when the nut is first applied about the shaft in comparison to a substantially reduced torque required to remove the nut from the shaft. The torque required for subsequent installation and removal cycles also tends to decrease but at a lesser and more constant rate with increasing numbers of installation and removal cycles. In most prior art lock nuts, the greatest decrease in torque occurs between the first installation and the first removal. Torque performance is often characterized by an average torque and its corresponding statistical spread over several nut installation and removal cycles. In addition to the decreasing torque discussed above, the torque performance of prior art lock nuts tends to have a relatively large statistical spread, which often results in failure of the lock nut to satisfy or comply with industry established torque specifications.

U.S. Pat. No. 5,499,893 to Thurston et al. issued on 19 Mar. 1996, entitled "Flexible Lock Nut and Method of Manufacture", assigned to the assignee of the present invention and incorporated herein by reference discloses a lock nut with a low first installation torque and a high removal torque that provides a relatively consistent torque performance over several installation and removal cycles. The lock nut includes a body member with a threaded bore that is partially deformed or distorted by compressing a portion of a periphery of the body member to obtain a substantially elliptical or oval shape bore diameter portion. While the lock nut of this invention is a remarkable improvement over prior art lock nuts, there remain some applications requiring improved torque performance or wherein the structure of the lock nut is not usable.

U.S. patent application Ser. No. 08/628,923 filed on Apr. 8, 1996, entitled "Prevailing Torque Nut", assigned to the assignee of the present invention and also incorporated herein by reference discloses a lock nut with relatively consistent torque performance and reduced statistical spread over several installation and removal cycles. The lock nut includes a body member with a threaded bore that is partially deformed or distorted by a plurality of resilient posts inclined inwardly toward the bore axis and a pair of resilient arms extending from each post and depressed downwardly toward the body member. While this invention also is a remarkable improvement over prior art lock nuts, there remain other applications which require still greater improvements in torque performance or wherein the structure of the lock not is not usable.

In view of the discussion above, there exists a demonstrated need for an advancement in the art of making lock nuts with improved torque performance.

It is therefore an object of the invention to provide a novel method for making a lock nut with a relatively improved torque performance that overcomes problems in the prior art.

It is also an object of the invention to provide a novel method for making a lock nut with a relatively consistent torque performance and reduced statistical spread that is economical to practice.

It is another object of the invention to provide a novel method for making a lock nut with a relatively consistent torque performance and reduced statistical spread that is applicable to many different types of lock nuts.

Accordingly, the present invention is drawn to a method for making a lock nut engagable and retainable about a threaded shaft wherein a body member having a bore is threaded for receiving a threaded shaft, and at least a portion of the bore is deformed to provide shaft engaging means engagable with a threaded shaft disposed in the bore. The deformed portion of the bore is then sized with a threaded sizing tool that is oversized relative to the deformed portion of the bore and undersized relative to any undeformed portion of the bore to provide a sized lock nut with a relatively consistent torque performance and a reduced statistical spread over several nut installation and removal cycles about the threaded shaft. The body member may alternatively be plated and heat treated before sizing.

These and other objects, features and advantages of the present invention will become more fully apparent upon consideration of the following Detailed Description of the Invention with the accompanying drawings, which may be disproportionate for ease of understanding, wherein like structure and steps are referenced by corresponding numerals and indicators.

BRIEF DESCRIPTION OF THE DRAWINGS

FIG. 1 is a sectional view of an exemplary lock nut embodiment that is sizable according to the method of the present invention.

FIG. 2 is a sectional view of an alternative lock nut embodiment that is sizable according to the method of the present invention.

FIG. 3 is an exemplary sizing tool for practicing the method of the present invention.

DETAILED DESCRIPTION OF THE INVENTION

Figure 4:
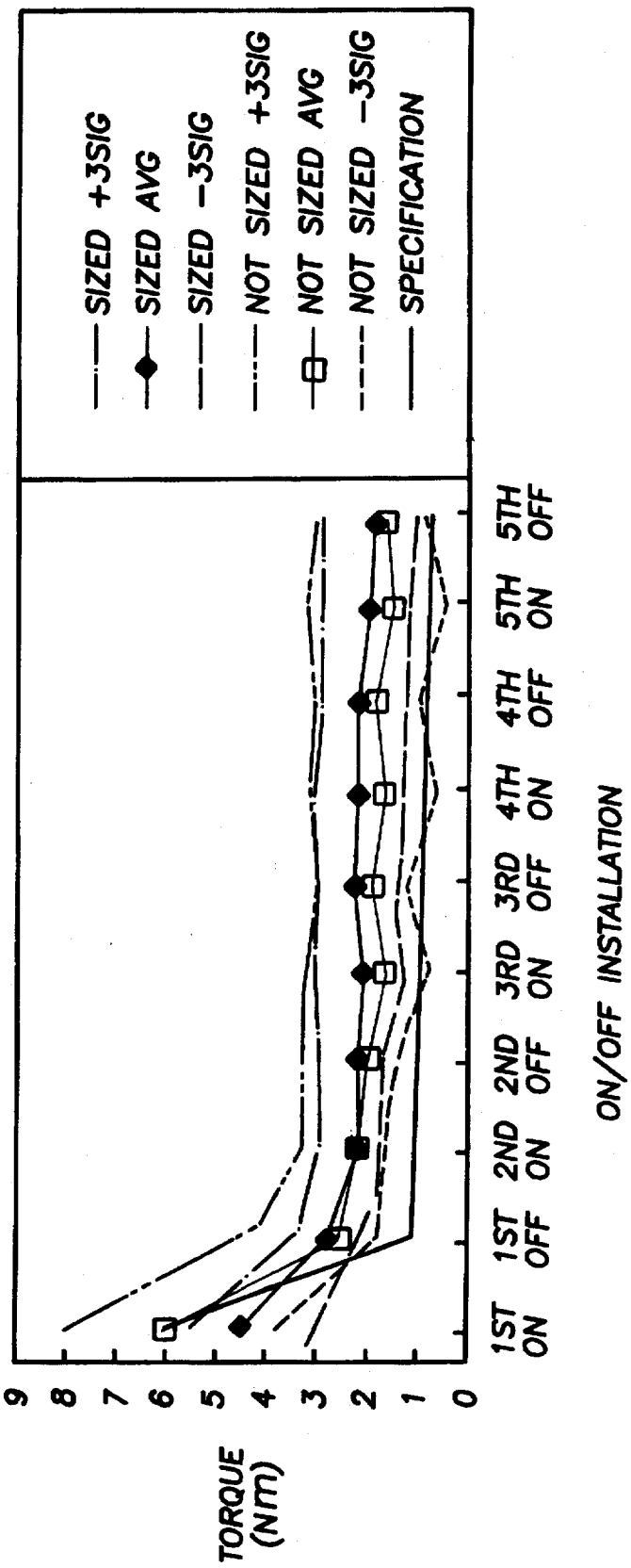
FIG. 4 is a graphical illustration of the relative improvement in torque performance versus installation cycle realizable for a lock nut sized according to the method of present invention.

The present invention relates to a method for sizing a lock nut of the type engagable and retainable about a threaded shaft. Lock nuts sized according to the invention have a relatively improved torque performance that is more consistent over several installation and removal cycles of the nut about a threaded shaft in comparison to the torque performance of the same type of lock nut without sizing. The sized lock nuts also have a reduced statistical spread in comparison to lock nuts not sized according to the invention. Although some aspects of the invention are discussed in the context of the exemplary lock nut embodiments of FIGS. 1 and 2, the method of the present invention is applicable to most types of lock nuts.

In one mode of practice, a body member with a bore is threaded for receiving a threaded shaft. The bore is also deformed to provide a shaft engaging means engagable with a shaft disposed in the deformed bore. The step of deforming the bore includes providing any distortion along any portion of the threaded bore. The step of deforming the bore also may include providing any structure within the bore, or adjacent end portions of the bore to constrict the bore. The threaded shaft engagement means include, among other structure, the structure disclosed in the copending patent applications incorporated herein by reference, spring biased members protruding into or along the bore, and friction generating plastic members disposed within the bore or on either end portion of the nut adjacent to the bore. Accordingly, in some embodiments, the bore is first threaded and then deformed, and in other embodiments, the bore is first deformed and then threaded depending on the type of shaft engaging means.

FIG. 1 is a sectional view of a lock nut as disclosed in U.S. Pat. No. 5,499,893 to Thurston et al. issued on 19 Mar. 1996, entitled "Flexible Lock Nut and Method of Manufacture". The lock nut includes a body member 100 with a threaded bore 110 that is partially deformed by compressing a portion 105 of a periphery of the body member with opposing rollers or other members not shown in the Drawing to obtain a substantially elliptical or oval shape bore diameter portion 112 that forms the shaft engaging means. FIG. 2 is a sectional view of a lock nut as disclosed in U.S. patent application Ser. No. 08/628,923 filed on Apr. 8, 1996, entitled "Prevailing Torque Nut". The lock nut includes a body member 100 with a threaded bore 110 that is partially deformed by a plurality of resilient posts 120 inclined inwardly toward the bore axis and a pair of resilient arms 130 extending from each post and depressed downwardly toward the body member that forms the shaft engaging means.

After threading and deforming, the deformed bore portion is sized with a threaded sizing tool that is oversized relative to the deformed bore portion and undersized relative to any undeformed bore portion. In some applications, the sizing tool has the same thread pitch as the undeformed bore portion, and in other applications, the sizing tool has a different thread pitch, or a combination of different thread pitch and different diameter.

FIG. 3 is a side view of an exemplary embodiment of a sizing tool 300 usable for practicing the invention. The sizing tool 300 includes a threaded end portion 310, which may have a tapered tip portion 312 to facilitate insertion of the tool into the bore. The sizing tool may have a circular sectional dimension, or a triangular or other sectional shape. The sizing tool may alternatively be of the form of a threaded tap with cutting edges. In one embodiment, the sizing tool is formed of a material, like a hardened steel, which is harder than the material of the lock nut.

In one mode of practice, the step of sizing the deformed bore portion includes a step of threading the sizing tool at least through the deformed bore portion. In an alternative embodiment, the step of sizing the deformed portion of the bore includes steps of threading the sizing tool through the deformed bore portion and through any undeformed portion of the bore. In the embodiments of FIGS. 1 and 2, the sizing tool is threaded initially into the undeformed bore portion through end 104 wherein the undersized threads advance the sizing tool through the undeformed bore portion without substantial resistance. As the sizing tool continues to advance through the bore, the sizing tool engages and sizes the deformed bore portion as the undeformed bore portion aligns the sizing tool.

Figure 5:
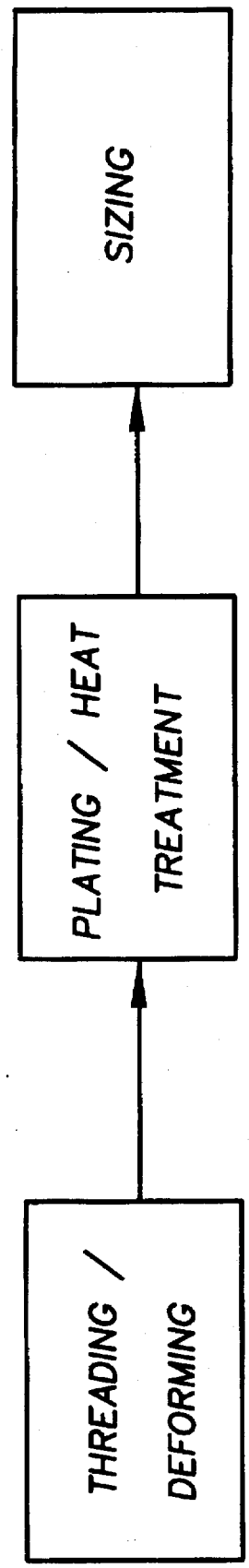
FIG. 5 is a schematic manufacturing flow diagram illustrating exemplary processes for making a lock nut according to the present invention.

In another mode of practice, the nut is plated or otherwise treated before the sizing step to provide corrosion resistance, or to improve solderability, or for other purposes known in the metal treatment art. The nut may for example be subject to cadmium plating, electroplating, zinc/aluminium rich organic painting, phosphate and oil bathing, and other platings and treatments. The lock nut may also be subject to a heat treatment either before or after the sizing step. In one sizing process, the lock nut is sized after plating and heat treating. FIG. 5 is a schematic manufacturing flow diagram illustrating exemplary processes for making a lock nut according to the present invention.

FIG. 4 is a graphical illustration of the relative improvement in torque performance versus installation and removal cycle realizable for a lock nut sized according to the method of present invention. The squares interconnected by the solid line plot average torque values for an unsized lock nut, and the double dashed lines plot a statistical spread between "+3Sigma" and "−3Sigma" for the unsized lock nut. The solid line is an Established Specification which is satisfied when the "1st On" torque is below the solid line and when the "1st Off" torque through the "5th Off" torque are above the solid line. The unsized lock nut has a substantial decrease in torque performance between the "1st On" and the "1st Off", which is common among prior art lock nuts. The graph illustrates that the average torque performance for the unsized lock nut is questionably within the Established Specification at the "1st On", and that the statistical spread along the "−3sigma" line occasionally falls below the Established Specification over the course of several subsequent On/Off cycles.

The solid diamonds interconnected by the solid line plot average torque values for a lock nut sized according to the present invention, and the single dashed lines plot a statistical spread between "+3Sigma" and "−3Sigma" for the sized lock nut. The graph illustrates that the average "1st On" torque of the sized lock nut is reduced relative to the average "1st On" torque for the unsized nut. The graph also illustrates that the sized lock nut has a relatively consistent torque performance in comparison to the torque performance of the unsized lock nut, and that the statistical spread of the torque performance for the sized lock nut is reduced relative to the statistical spread for the unsized lock nut. One advantage of the improved torque performance resulting from the method of the present invention is that lock nuts with the relatively consistent torque performance and the reduced statistical spread are better able to comply with the Established Specifications. The improved torque performance resulting from the present invention is even more significant when applied to the exemplary lock nuts of FIGS. 1 and 2, which have relatively improved torque performance characterized by a more consistent torque performance and a reduced statistical spread before sizing in comparison to prior art lock nuts.

While the foregoing written description of the invention enables anyone skilled in the art to make and use what is at present considered to be the best mode of the invention, it will be appreciated and understood by those skilled in the art the existence of variations, combinations, modifications and equivalents within the spirit and scope of the specific exemplary embodiments disclosed herein. The present invention therefore is to be limited not by the specific exemplary embodiments disclosed herein but by all embodiments within the scope of the appended claims.

What is claimed is:

1. A method for making a lock nut engagable and retainable about a threaded shaft, the method comprising steps of:
   threading a bore of a body member for receiving a threaded shaft;
   deforming at least a portion of the bore to provide a shaft engaging means engagable with a threaded shaft disposed in the deformed bore;

sizing the deformed portion of the threaded bore with a threaded sizing tool by threading the sizing tool through at least the deformed portion of the threaded bore, the threaded sizing tool oversized relative to the deformed portion of the bore and undersized relative to any undeformed portion of the bore, wherein the sized lock nut has a relatively consistent torque performance and a reduced statistical spread over several installation and removal cycles of the nut about the threaded shaft.

2. The method of claim 1 wherein the step of sizing the deformed portion of the threaded bore includes a step of threading the sizing tool through the deformed portion of the bore and through any undeformed portion of the threaded bore.

3. The method of claim 1 further comprising a step of plating the body member before sizing the deformed portion of the threaded bore.

4. The method of claim 1 further comprising a step of heat treating the body member.

5. The method of claim 1 wherein the step of deforming a portion of the bore includes a step of compressing at least a portion of a periphery of the body member to distort a diameter of the threaded bore.

6. The method of claim 5 further comprising a step of plating the body member before sizing the deformed portion of the threaded bore.

7. The method of claim 5 further comprising a step of heat treating the body member.

8. The method of claim 1 wherein the step of deforming a portion of the threaded bore includes steps of inclining inwardly toward a bore axis a plurality of resilient posts extending along the body member, and depressing downwardly toward the body member a pair of resilient arms extending from each resilient post.

9. The method of claim 8 further comprising a step of plating the body member before sizing the deformed portion of the threaded bore.

10. The method of claim 8 further comprising a step of heat treating the body member.

* * * * *